R. E. HELLMUND.
CONTROL SYSTEM.
APPLICATION FILED MAR. 23, 1914.
1,224,167.
Patented May 1, 1917.
2 SHEETS—SHEET 1.
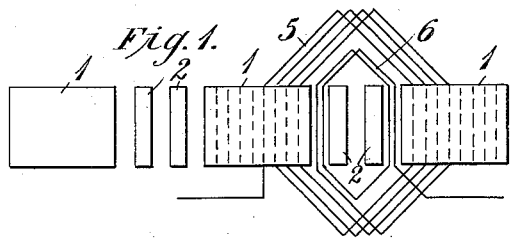
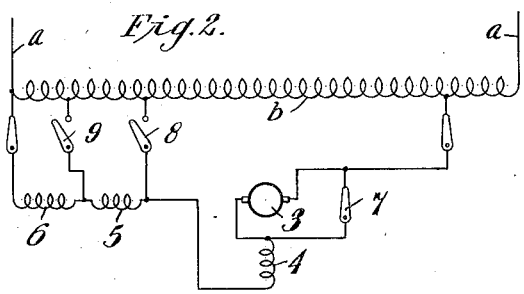
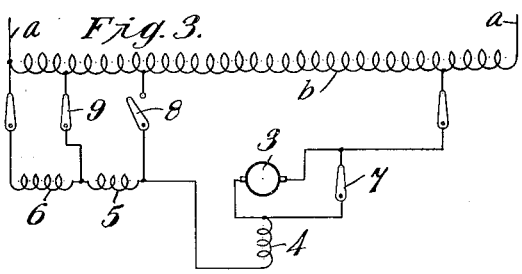
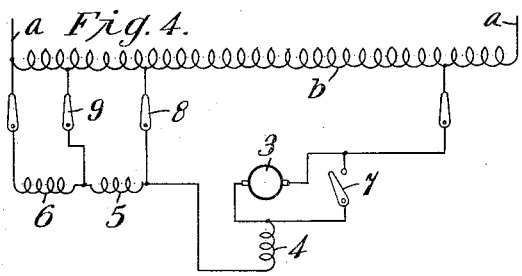
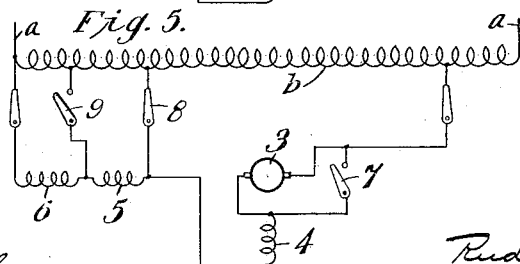
WITNESSES:
INVENTOR
Rudolf E. Hellmund
BY
ATTORNEY R. E. HELLMUND.
CONTROL SYSTEM.
APPLICATION FILED MAR. 23, 1914.
1,224,167.
Patented May 1, 1917.
2 SHEETS—SHEET 2.
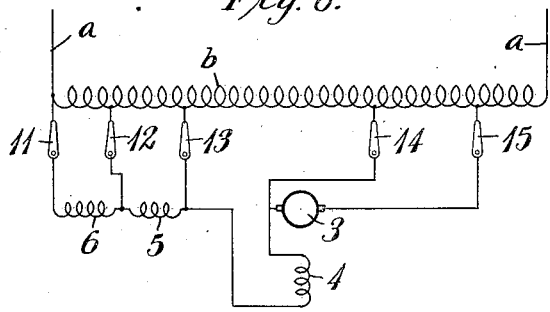
Fig. 6.
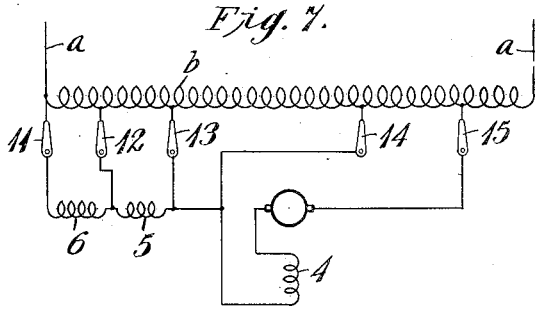
Fig. 7.
Fig. 8.
| Operating Position | Switch | | | | |
|---|---|---|---|---|---|
| | 11 | 12 | 13 | 14 | 15 |
| a | o | | | o | o |
| b | o | o | | | o |
| c | o | o | | | |
| d | o | o | o | | o |
| e | o | | o | | o |
WITNESSES:
Fred H Miller
W. R. Coley
INVENTOR
Rudolf E. Hellmund
BY
Wesley G. Carr
ATTORNEY

UNITED STATES PATENT OFFICE.

RUDOLF E. HELLMUND, OF PITTSBURGH, PENNSYLVANIA, ASSIGNOR TO WESTING-HOUSE ELECTRIC AND MANUFACTURING COMPANY, A CORPORATION OF PENNSYLVANIA.

CONTROL SYSTEM.

1,224,167.  Specification of Letters Patent.  Patented May 1, 1917.

Application filed March 23, 1914. Serial No. 826,552.

*To all whom it may concern:*

Be it known that I, RUDOLF E. HELLMUND, a subject of the German Empire, and a resident of Pittsburgh, in the county of Allegheny and State of Pennsylvania, have invented a new and useful Improvement in Control Systems, of which the following is a specification.

My invention relates to systems and methods of control, and it has special reference to the control of alternating current motors of the commutator type.

The object of my invention is to provide simple and inexpensive means for maintaining proper commutating conditions in a machine of the above-indicated character during accelerating periods.

As is well known, when starting an alternating-current motor of the commutator type, a weakened exciting field flux is customarily employed to prevent undue sparking at the brushes by reason of excessive transformer action in the coils short-circuited by the brushes, as would be the case with a heavy exciting flux. In this way, the high armature current required to produce a satisfactory starting torque is obtained without causing such undue sparking. On the other hand, in order to secure proper commutating conditions in the motor, a relatively strong compensating flux should be provided at starting, and this flux should be suitably weakened as the motor speed increases.

One system of control for accomplishing the first of the above-mentioned objects comprises the initial series-circuit connection of the exciting and the compensating field windings and the subsequent changing over to a series-circuit connection of the exciting field and the armature windings. The system just recited is fully set forth in my co-pending application, Serial No. 810,764, filed January 7, 1914.

According to my present invention, I provide means for properly varying the commutating flux in the motor as its speed increases, as hereinafter more fully set forth.

In the accompanying drawing, Figure 1 is a diagrammatic development view of a portion of a dynamo-electric machine, showing the preferred arrangement of certain of the field windings thereof, Figs. 2 to 5, inclusive, are diagrammatic views of a system of control embodying my invention; Figs. 6 and 7 are diagrammatic views of other types of control systems embodying my invention; and Fig. 8 is a chart of well-known form showing the sequence of operation of the switches illustrated in Figs. 6 and 7.

Referring to Fig. 1 of the drawings, the portion of a dynamo-electric machine here shown comprises a field magnetic structure provided with a plurality of alternately disposed main polar projections 1 and auxiliary or interpolar projections 2; and an auxiliary or compensating field winding which is shown as divided into two parts, one of which, designated as 5, is of the familiar distributed type and the other of which, designated as 6, preferably surrounds the interpolar projections 2 only. The first part may be referred to as the distributed compensating winding and the second part as the interpolar compensating winding. The purpose of the division of the compensating winding is hereinafter pointed out.

Reference may now be had to the Figs. 2 to 5 of the drawings, wherein is shown a supply circuit $a$—$a$, a suitable transformer winding $b$ energized therefrom, and an alternating current motor of the commutator type connected to the transformer winding $b$ through a plurality of suitable switches and comprising an armature winding 3, a main or exciting field winding 4, the distributed compensating winding 5 and the preferably interpolar compensating winding 6. A switch 7 is provided for short-circuiting the armature winding 3 during the initial starting period, a second switch 8 is adapted to connect a point intermediate the main field winding 4 and the distributed compensating winding 5 to an intermediate point in the transformer winding $b$, and another switch 9 is adapted to connect a point intermediate the two parts of the compensating winding to a second intermediate point in the transformer winding $b$.

Assuming the various parts of the control system to occupy the positions shown in Fig. 2, the operation of the system may be described as follows, first in general terms and then more specifically with respect to the drawing. To accomplish the desired result, I provide the motor with the compensating winding having two parts, one of which preferably surrounds the interpolar projections only and may be termed the interpolar compensating winding, and the other of which is of the customary distributed type and may be designated as the distributed compensating winding. The total turns of the auxiliary windings are preferably greater in number than the armature turns.

The motor is started preferably as a repulsion motor, that is, with the armature winding short-circuited, and with the other motor windings in series-circuit relation to the armature across a predetermined portion of an auto-transformer winding or the equivalent, the compensating windings being designed to produce a proper commutating flux under the conditions recited. The interpolar and the distributed compensating windings are then successively connected across predetermined relatively independent voltages, that is, across predetermined contiguous portions of the transformer winding, as the motor speed increases, the steps of voltages being of such gradually weakening values that proper commutating conditions in the motor are again secured. The connection from the motor field windings to the point between the contiguous transformer portions above referred to, may then be opened to afford another commutating step. The motor is thus started initially as a repulsion motor having a relatively weak exciting flux. As the motor speed increases, the compensating flux is gradually weakened, substantially in accordance with the decrease of motor current, and the motor then runs as a "doubly-fed" machine.

An additional advantage of the above-described control system resides in the fact that the voltage impressed on the compensating windings is varied without interruption of the circuit without employing the hitherto requisite preventive resistance in the motor or preventive choke coils between taps of the transformer. It will be understood that the accomplishment of satisfactorily adjusting the compensating field flux to properly meet the conditions of changing motor speed by simple switching means, and without the aid of such preventive resistances or choke coils, materially increases the operating efficiency and decreases the constructional cost of a control system embodying my invention.

More specifically stated, the motor is first connected across a predetermined portion of the transformer winding $b$, with the switch 7 closed and the switches 8 and 9 open as shown in Fig. 2, thereby starting the motor as a repulsion motor, with all of its field windings in series circuit connection with its armature winding. The compensating winding is so designed that a proper value of commutating flux is produced in the motor armature during the starting of the motor.

When the motor has accelerated a certain amount, the switch 9 is closed, thereby connecting the interpolar compensating winding 6 across a relatively independent portion of the winding $b$, in order to again secure proper commutation in the motor. (See Fig. 3.) The third step comprises the opening of the short-circuiting switch 7 and the substantially simultaneous closing of the switch 8. (See Fig. 4.) The switch 9 may then be opened and the motor will be operated as a "doubly-fed" machine, as indicated in Fig. 5, whereby in each case, the strength of the compensating field flux is again adjusted to the new conditions demanded by increases in motor speed.

Thus, the motor is started as a repulsion motor with a relatively strong compensating field flux, and the value of this compensating flux is weakened in successive steps, as the motor speed increases.

Moreover, it will be noted that the strength of the compensating field is varied through the manipulation of the simple switches 8 and 9 without employing the hitherto necessary preventive resistance or preventive choke coils, as hereinbefore pointed out.

Reference may now be had to Figs. 6, 7 and 8, wherein modifications of my invention are illustrated. In Fig. 6, a motor of the doubly-fed type throughout operation, is shown, the armature 3 being adapted for independent connection across a predetermined portion of the transformer winding $b$ at starting. In Fig. 7, the armature 3 and main field winding 4 are adapted for the connection just recited, the motor thus constituting a modified form of the "doubly-fed" type. For purposes of illustration, a series of five switches 11 to 15 are shown in the drawing in connection with each of the systems illustrated in Figs. 6 and 7. The sequence of operation of the switches in each system is indicated in the chart of Fig. 8. Since the operation is quite similar to that of the system shown in Figs. 2 to 5, inclusive, no further description thereof is deemed necessary.

Variations in the circuit connections and arrangement of parts may be made within the spirit and scope of my invention, and I desire that only such limitations shall be imposed as are indicated in the appended claims.

I claim as my invention:

1. The method of accelerating an alternating current motor of the commutator type, having an armature winding, an exciting winding and a plurality of compensating windings, from a derived source of energy and simultaneously maintaining proper commutating conditions in the motor, that consists in starting the motor with said exciting and compensating windings in series-circuit relation, subsequently successively applying relatively independent voltages from said source to the compensating windings, as the motor speed increases and finally connecting said compensating windings in series-circuit relation across a portion of said source.

2. The method of accelerating an alternating current motor of the commutator type, having an armature winding, an exciting winding and a distributed and an interpolar compensating winding, from a transformer winding and simultaneously maintaining proper commutating conditions in the motor, that consists in starting the motor with said exciting and compensating windings in series-circuit relation and with the armature short-circuited, successively connecting said interpolar and said distributed compensating windings across predetermined contiguous portions of said transformer winding as the motor speed increases, opening the armature short-circuit substantially simultaneously with said last connection, and opening the motor connection to the point between said contiguous portions of the transformer winding.

3. The method of operating an alternating-current motor of the commutator type having an armature winding, an exciting field winding and a plurality of compensating field windings from a transformer winding that consists in initially connecting said exciting and compensating field windings in series-circuit relation and then directly connecting said compensating windings to said transformer winding, first individually and then collectively.

4. The method of operating an alternating-current motor of the commutator type having an armature winding, an exciting field winding and a distributed and an interpolar compensating field winding from a transformer winding that consists in connecting said exciting and said compensating field windings in series-circuit relation to produce a relatively strong compensating flux at starting, connecting first one and then the other of said compensating windings directly to predetermined portions of said transformer and, finally, similarly connecting said compensating windings in series-circuit relation across a portion of the transformer winding, to produce gradually weakening commutating fluxes as the motor speed increases.

5. The method of operating an alternating-current motor of the commutator type having an armature winding, an exciting field winding and a distributed and an interpolar compensating field winding from a transformer winding that consists in the following steps: short-circuiting the armature winding and connecting all said field windings in series-circuit connection therewith at starting, connecting the junction-point of said compensating field windings to a predetermined point of said transformer winding, connecting the innermost terminal of the compensating windings to a second predetermined point of the transformer winding and substantially simultaneously removing the armature short-circuit, and finally disconnecting said junction-point from the transformer winding.

In testimony whereof, I have hereunto subscribed my name this 19th day of Mar. 1914.

RUDOLF E. HELLMUND.

Witnesses:
J. V. DOBSON,
B. B. HINES.